(12) United States Patent
Dingle et al.

(10) Patent No.: US 8,892,761 B1
(45) Date of Patent: Nov. 18, 2014

(54) PROGRESSIVE DOWNLOAD PLAYBACK

(75) Inventors: Nick Dingle, Burlington (CA); Hui Gang Zhang, Markham (CA); Igor Sandler, Thornhill (CA); Kavi Maharajh, Oakville (CA)

(73) Assignee: Quickplay Media Inc., Toronto (CA)

( * ) Notice: Subject to any disclaimer, the term of this patent is extended or adjusted under 35 U.S.C. 154(b) by 423 days.

(21) Appl. No.: 12/418,576

(22) Filed: Apr. 4, 2009

Related U.S. Application Data

(60) Provisional application No. 61/042,634, filed on Apr. 4, 2008.

(51) Int. Cl.
G06F 15/16 (2006.01)

(52) U.S. Cl.
USPC .......................................... 709/231; 709/219

(58) Field of Classification Search
CPC ....................................................... H04K 3/00
USPC .................................. 709/231, 219
See application file for complete search history.

(56) References Cited

U.S. PATENT DOCUMENTS

| | | | |
|---|---|---|---|
| 5,999,937 A | 12/1999 | Ellard | |
| 6,704,576 B1 | 3/2004 | Brachman et al. | |
| 6,765,868 B1 * | 7/2004 | Dunn et al. | 370/230 |
| 7,187,690 B2 | 3/2007 | Taylor | |
| 7,222,297 B2 | 5/2007 | Goodwin et al. | |
| 7,280,975 B1 | 10/2007 | Donner | |
| 7,581,166 B2 | 8/2009 | Renger et al. | |
| 7,805,338 B2 | 9/2010 | Kolls | |
| 7,831,199 B2 | 11/2010 | Ng et al. | |
| 7,921,157 B2 | 4/2011 | Brown | |
| 8,219,134 B2 | 7/2012 | Maharajh et al. | |
| 2002/0069243 A1 | 6/2002 | Raverdy et al. | |
| 2002/0124258 A1 | 9/2002 | Fritsch | |
| 2003/0014483 A1 | 1/2003 | Stevenson et al. | |
| 2003/0217007 A1 | 11/2003 | Fukishima et al. | |
| 2004/0019509 A1 | 1/2004 | Bekkers | |
| 2004/0166834 A1 | 8/2004 | Omar et al. | |

(Continued)

FOREIGN PATENT DOCUMENTS

| | | |
|---|---|---|
| JP | 2004297628 | 10/2004 |
| WO | WO-2006/110322 A2 | 10/2006 |

(Continued)

OTHER PUBLICATIONS

USPTO, Office Action for related co-pending application U.S. Appl. No. 11/956,162, filed Dec. 13, 2007, entitled "Seamlessly Switching among Unicast, Multicast, and Broadcast Mobile Media Content", Office Action mailed Jan. 6, 2011.

(Continued)

*Primary Examiner* — Maceeh Anwari

(74) *Attorney, Agent, or Firm* — GTC Law Group LLP & Affiliates

(57) ABSTRACT

The present invention provides methods and systems for enabling content streaming on mobile devices. The methods and systems may include encoding a content stream; providing the encoded content stream to a splitter embodied in computer executable code, which splits the encoded content stream into at least two channels, with each channel having data of a characteristic chunk size; downloading at least one data chunk into a playback queue, wherein a download algorithm determines the at least one chunk to be downloaded; and providing the at least one downloaded chunk to a media player.

16 Claims, 1 Drawing Sheet

(56) References Cited

U.S. PATENT DOCUMENTS

| | | | |
|---|---|---|---|
| 2004/0193648 A1 | 9/2004 | Lai et al. | |
| 2005/0113066 A1 | 5/2005 | Hamberg | |
| 2005/0128995 A1 | 6/2005 | Ott et al. | |
| 2005/0152449 A1 | 7/2005 | Nemiroff et al. | |
| 2005/0153650 A1 | 7/2005 | Hikomoto | |
| 2005/0172154 A1 | 8/2005 | Short et al. | |
| 2005/0210498 A1 | 9/2005 | Scott, III et al. | |
| 2005/0233693 A1 | 10/2005 | Karaoguz et al. | |
| 2005/0246193 A1 | 11/2005 | Roever et al. | |
| 2006/0031551 A1 | 2/2006 | Agresta et al. | |
| 2006/0146854 A1 | 7/2006 | Park | |
| 2006/0218611 A1 | 9/2006 | Son et al. | |
| 2007/0002858 A1 | 1/2007 | Bichot et al. | |
| 2007/0060129 A1 | 3/2007 | Ramer et al. | |
| 2007/0061245 A1 | 3/2007 | Ramer et al. | |
| 2007/0081586 A1 | 4/2007 | Raveendran et al. | |
| 2007/0089151 A1* | 4/2007 | Moore et al. | 725/132 |
| 2007/0157248 A1 | 7/2007 | Ellis | |
| 2007/0254619 A1 | 11/2007 | Salomone et al. | |
| 2007/0268164 A1 | 11/2007 | Lai et al. | |
| 2008/0083003 A1 | 4/2008 | Biniak et al. | |
| 2008/0088735 A1 | 4/2008 | Biniak et al. | |
| 2008/0155635 A1 | 6/2008 | Johnson et al. | |
| 2008/0195664 A1 | 8/2008 | Maharajh et al. | |
| 2008/0200153 A1 | 8/2008 | Fitzpatrick et al. | |
| 2008/0200154 A1 | 8/2008 | Maharajh et al. | |
| 2008/0201225 A1 | 8/2008 | Maharajh et al. | |
| 2008/0201386 A1 | 8/2008 | Maharajh et al. | |
| 2008/0207137 A1 | 8/2008 | Maharajh et al. | |
| 2008/0207182 A1 | 8/2008 | Maharajh et al. | |
| 2008/0288771 A1 | 11/2008 | Kulakowski et al. | |
| 2009/0049097 A1 | 2/2009 | Nocifera et al. | |
| 2011/0225417 A1 | 9/2011 | Maharajh et al. | |
| 2012/0208512 A1 | 8/2012 | Maharajh et al. | |

FOREIGN PATENT DOCUMENTS

| | | |
|---|---|---|
| WO | WO-2006/113975 A1 | 11/2006 |
| WO | WO-2008/072093 A2 | 6/2008 |
| WO | WO-2008/072093 A3 | 2/2011 |
| WO | WO-2011/041916 A1 | 4/2011 |

OTHER PUBLICATIONS

USPTO Office Action for related U.S. Appl. No. 12/956,138 entitled "Consumption Profile for Mobile Media" to Maharajh et al., filed Dec. 13, 2007, Office Action mailed Jan. 19, 2011.

USPTO, Office Action for related U.S. Appl. No. 11/956,184, entitled "Automated Content Tag Processing for Mobile Media", Office Action mailed Oct. 4, 2010.

USPTO, Office Action for related U.S. Appl. No. 11/956,184, entitled "Automated Content Tag Processing for Mobile Media", Office Action mailed Mar. 18, 2010.

USPTO, Office Action for related U.S. Appl. No. 11/956,194, entitled "Mediation and Settlement for Mobile Media", Office Action mailed Nov. 10, 2010.

07872056.2, "European Application Serial No. 07872056.2, Extended European Search Report mailed Sep. 19, 2012", 14 pages.

"U.S. Appl. No. 11/956,138, Non Final Office Action mailed Jan. 19, 2011", 30 pages.

Steck, Chris, "Delivering Total Mobile TV", URL :http://docs . real .com/docs/industries/DeliveringTotalMobileTV.pdf, XP002482031, retrieved on May 20, 2008, pp. 5-10, Apr. 2006, 1-12.

Einarsson, et al., "Multiple aggregated control URIs for RTSP", http://tools.ietf.org/id/draft-einarsson-mmusic-rtsp-macuri-00.txt, Network Working Group, Internet-Draft, <draft-einarsson-mmusic-rtsp-macuri-OO> Retrieved from the Internet on Jun. 18, 2008, Jun. 19, 2006, 11 pages.

PCT/CA2010/001636, "International Application Serial No. PCT/CA2010/001636, International Preliminary Report on Patentability mailed Apr. 19, 2012", 7 pages.

PCT/CA2010/001636, "International Application Serial No. PCT/CA2010/001636, International Search Report and Written Opinion mailed Feb. 8, 2011", 8 pages.

PCT/IB2007/004401, "International Application Serial No. PCT/IB2007/004401, International Search Report mailed Aug. 8, 2008", 7 pages.

* cited by examiner

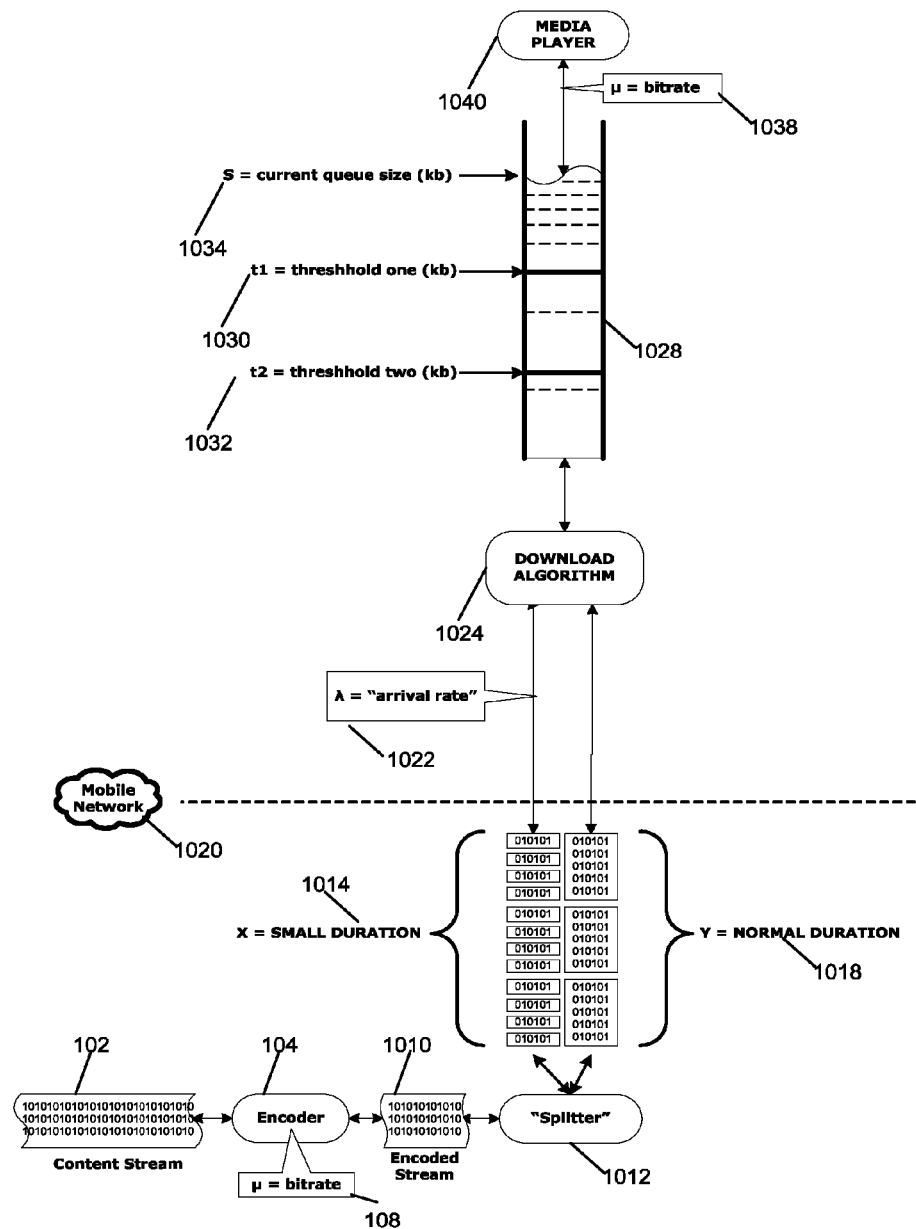

PROGRESSIVE DOWNLOAD PLAYBACK

CROSS-REFERENCE TO RELATED APPLICATIONS

This application claims the benefit of U.S. Provisional Patent Application No. 61/042,634, filed Apr. 4, 2008, to Nick Dingle, entitled "PROGRESSIVE DOWNLOAD PLAYBACK" which is also hereby incorporated by reference in its entirety. This application also incorporates material from the following related U.S. Patent Application Publications, each of which is hereby incorporated by reference in its entirety U.S. Patent Publication No. US-2008-0201225A1 to Maharajh et. al., published on Aug. 21, 2008 and entitled "Consumption Profile for Mobile Media"U.S. Patent Publication No. US-2008-0207137A1 to Maharajh et. al., published on Aug. 28, 2008 and entitled "Seamlessly Switching among Unicast, Multicast, and Broadcast Mobile Media Content"U.S. Patent Publication No. US-2008-0207182A1 to Maharajh et. al., published on Aug. 28, 2008 and entitled "Encoding and Transcoding for Mobile Media"U.S. Patent Publication No. US-2008-0195664A1 to Maharajh et. al., published on Aug. 14, 2008 and entitled "Automated Content Tag Processing for Mobile Media"U.S. Patent Publication No. US-2008-0200154A1 to Maharajh et. al., published on Aug. 21, 2008 and entitled "Mobile Media Pause and Resume" and U.S. Patent Publication No. US-2008-0201386A1 to Maharajh et. al., published on Aug. 21, 2008 and entitled "Mediation and Settlement for Mobile Media".

BACKGROUND

1. Field

The invention herein disclosed generally relates to audio streaming networks, and specifically to live audio streaming in mobile devices.

2. Description of the Related Art

Real Time Streaming is a protocol (RTSP) which allows a client to remotely control a streaming media server, issuing VCR-like commands such as "play" and "pause," and allowing time-based access to files on a server.

Conventionally, mobile devices contain wireless technology which allows them to consume audio data on high-speed networks. This makes live audio streaming possible. But, there are many mobile devices which do not support the RTSP audio streaming protocol. This may be due to the mobile devices' operating system.

Therefore, in light of the above, there is a need for methods and systems which enable live audio streaming on these mobile devices, despite lack of support for RTSP. In addition, there is a need to reduce startup time for downloading of audio data and reducing buffering of audio data, as well as improving the quality of audio playback.

SUMMARY

The present invention provides methods and systems for enabling content streaming on mobile devices. In embodiments, methods and systems may be provided for enabling content streaming on a mobile device, comprising encoding a content stream providing the encoded content stream to a splitter embodied in computer executable code, which splits the encoded content stream into at least two channels, with each channel having data of a characteristic chunk size; downloading at least one data chunk into a playback queue, wherein a download algorithm determines the at least one chunk to be downloaded; and providing the at least one downloaded chunk to a media player. In embodiments, the determination by the download algorithm may be based on at least an upper threshold, a lower threshold and a current queue size of the playback queue. In embodiments, the chunk sizes in the at least two channels may be whole number multiples of each other. In embodiments, the characteristic chunk size for each channel may be based on a time interval of the content. In embodiments, the characteristic chunk size for each channel may be based on file size. In embodiments, the mobile device may be a smart phone. In embodiments, the content stream may contain at least one of audio, video and data content. In embodiments, the content stream may contain metadata providing additional information regarding the content. In embodiments, the content stream may contain a live radio stream.

In embodiments, method and systems may be provided for enabling content streaming on a mobile device, comprising accepting a stream of data, wherein the data is encoded for a mobile network; spitting out a series of chunks of data sliced at particular time intervals; and controlling the frequency of downloading of the chunks of data into a playback queue based on thresholds. In embodiments, the frequency of downloading of the chunks of data may be based on based on at least an upper threshold, a lower threshold and a current queue size of the playback queue. In embodiments, the sizes of the chunks may be whole number multiples of each other. In embodiments, the data stream may contain at least one of audio and video content.

In embodiments, methods and systems may be provided for enabling content streaming on a mobile device, comprising an encoder that encodes a content stream to form an encoded content stream; a splitter embodied in computer executable code, which splits the encoded content stream into at least two channels, with each channel having data of a characteristic chunk size; a download algorithm that downloads at least one data chunk into a playback queue; and a media player to which at least one downloaded chunk from the playback queue is provided. In embodiments, the download algorithm may download based on at least an upper threshold, lower threshold and a current queue size of the playback queue. In embodiments, the chunk sizes in the at least two channels may be whole number multiples of each other. In embodiments, the characteristic chunk size for each channel may be based on a time interval of the content. In embodiments, the characteristic chunk size for each channel may be based on file size. In embodiments, the content stream may contain at least one of audio, video and data content. In embodiments, each data chunk may be encrypted.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following FIGURE:

FIG. 1 depicts an exemplary system for enabling streaming of content on mobile devices in accordance with an embodiment of the present invention.

DETAILED DESCRIPTION

While the specification concludes with the claims defining the features of the invention that are regarded as novel, it is believed that the invention will be better understood from a consideration of the following description in conjunction with the drawing, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

FIG. 1 depicts an exemplary method and system for enabling content streaming on mobile devices in accordance with an embodiment of the present invention. The content may be live content. The content may be audio content, video content, data and the like. In an embodiment, the content may be a live radio stream. The content may be in the form of a content stream 102. In embodiments, the content stream may contain data. In embodiments, the data, whether content or in the form of a content stream, may include metadata. In embodiments, the data may include a parallel metadata stream of compressed descriptors. In embodiments, the compressed descriptors may be synchronized precisely for delivery to an end point, such as a client. The metadata presentation may align accurately with the content stream (which may be an audio stream), including compatibility for distributed delivery models that include content delivery network or CDN integration. In embodiments, the content metadata may include descriptors of the content (such as audio data), URLs for supplemental data, identifiers for integrations to third party storefronts in a case where a user may have an option to purchase the content being streamed and the like. The methods and systems may include, without limitation, a content stream 102, an encoder 104, a bitrate 108, an encoded stream 1010, a splitter 1012, chunks of small duration 1014, chunks of normal duration 1018, a mobile network 1020, an arrival rate 1022, a download algorithm 1024, a playback queue 1028, a first threshold 1030, a second threshold 1032, a current queue size 1034, a bitrate 1038, a media player 1040 and the like.

The methods and systems may include components which may be installed on an application server to serve the content. The system may include components which may be installed on a mobile device for consuming content. The components may combine together to form methods and systems for streaming content, such as live audio, directly to the mobile device, such as to a media player 1040 on the mobile device. In an embodiment, an encoder 104 may encode the content stream 102. The encoder 104 may be an audio encoder, video encoder, data encoder or other encoder. The encoder may encode the content stream at a specific bitrate 108 or over a range of bitrates 108. The bitrate 108 or range of bitrates 108 may be determined by a user, the encoder 104 or by other means. The encoder 104 may produce an encoded stream 1010.

The methods and systems may include a splitter 1012. The splitter 1012 may be software, hardware and/or a mixture of software and hardware. The encoded stream 1010 may be provided to the splitter 1012. The splitter 1012 may accept a stream of data, such as audio or video data, which may be encoded for a mobile network, such as by third-party encoding software. The splitter 1012 may split the encoded stream 1010 into two or more sets or streams of chunks. The chunks may be for separate channels, such as separate radio channels. The chunks may be based on time. The chunks may be based on file size. The chunks may be sliced at particular time intervals. In embodiments, the splitter 1012 may create two repositories of chunks for each radio channel. In embodiments, the splitter 1012 may create two repositories of chunks based on time.

In embodiments, the splitter 1012 may create chunks of small duration 1014 and chunks of normal duration 1018. In a specific embodiment, the chunk of small duration 1014 may be 5 seconds long. In a specific embodiment, the chunk of normal duration 1018 may be 20 seconds long. In embodiments, a first repository may contain small duration chunks 1014 and a second repository may contain normal duration chunks 1018. For example, the small duration chunks 1014 may be said to have duration X seconds and the normal duration chunks 1018 may be said to have duration Y seconds. In certain embodiments, the normal duration chunks may be of longer duration 1018 than the short duration chunks 1014. In certain embodiments, the duration of the normal chunks may be divisible by the duration of short chunks. In the above example, Y may be divisible by X to produce a whole number. In other embodiments, there may be additional categories of duration chunks. For example, there may be 3, 4, 5 or n sizes of chunks. In other embodiments, the chunks within a category may have different durations. In other embodiments, the size of the chunks may be based on file size. In another embodiment, the splitter 1012 may create chunks of only one size. In another embodiment, the splitter 1012 may create chunks of only one size for a certain period of time.

In embodiments, the lengths of each chunk maybe configurable. For example, the length of each chunk may be 5 seconds, 20 seconds, 30 seconds, and the like. The methods and systems may include a download algorithm 1024. The download algorithm may download chunks over a mobile network 1020, other network or by other means. The downloads may be affected or characterized by an arrival rate 1022. In embodiments, the arrival rate 1022 may depend on network performance. The mobile device, such as through the download algorithm 1024, may download chunks. The mobile device may switch from downloading chunks of one size to another. In embodiments, the chunks provided for download may be switched from one size to another. For example, the mobile device may download a short duration chunk 1014 of 5 seconds and then may switch to download normal duration 1018 chunk of 10 seconds. In embodiments, each repository of chunks may represent live audio data, so the splitter 1012 may overwrite a chunk that no longer represents current content. In practice, to address latency, a small collection of chunks, say ~5-10 may be kept on the server before overwriting them. In embodiments, it may be necessary for the division between one chunk and another to be the same, so that the playback experience may be seamless to a listener.

The methods and systems may include security options. In embodiments, the splitting and preparation of the chunks, such as audio chunks, may include encryption of files using a private-public key based system or the like. The client player may have authenticated access to the encrypted streams and may hold the private key for decryption and playback of each chunk. Security options may also include one or more tokenized uniform resource identifiers or URI for access to the trusted file system source. In embodiments, this may prevent spidering and other techniques of accessing and learning the delivery protocol. These security measures may prevent tampering with the chunked files in order to effectively reproduce the stream on unauthorized end points The methods and systems may include a playback queue 1028. The playback queue 1028 may be included in the mobile device. The playback queue 1028 may be embodied in memory, such as device memory. The playback queue 1028 may form a buffer. The playback queue 1028 may be connected to the download algorithm 1024 and the media player 1040. The buffer may be formed between the download algorithm 1024 and the media player 1040. In embodiments, if the playback queue 1028 contains data, the media player 1040 may be playing. In a specific embodiment, as long as the playback queue 1028 contains audio data, the mobile device may continue playing from it, such as through the media player 1040. The download algorithm 1024 may control the downloading of new data into the playback queue 1028. The download algorithm 1024 may control which chunk is to be download next.

The download algorithm 1024 may facilitate an adaptive bitrate. The download algorithm 1024 may monitor and/or make use of one or more thresholds associated with the playback queue 1028. In embodiments, the playback queue 1028 may be associated with two thresholds, threshold one 1030 and threshold two 1032. In embodiments, threshold one 1030 may be an upper threshold and threshold two 1032 may be a lower threshold. In embodiments, the playback queue 1028 may also be associated with a current queue size 1034.

The download algorithm 1024 may monitor and/or make use of the thresholds and queue size according to an algorithm. In an embodiment, the algorithm may be "While (user is playing channel) {
IF (S<t1) {
download a new chunk from server
what size chunk?
IF (S<t2) {download a "small" chunk} else
{Download a "normal" chunk}
Wait until chunk downloads
add chunk to queue
}
}
Where S=current queue size
t1=upper threshold (kb)
t2=lower threshold (kb)
µ=bitrate
λ="arrival rate"which may depend on network performance. (Kbps)
Y=Normal Duration
The suggested threshold values may be $$t2=(Y*\mu^2)/\lambda$$

$$t1=t2+(Y*\mu)$$

In certain embodiments, the systems and methods, such as through the download algorithm 1024 and/or playback queue 1028, may constantly monitor the values of S and λ to do computations. In other embodiments, the monitoring may be less frequent than constantly. In embodiments, in a good network situation, t1 may be used to decrease the traffic on the application server. In embodiments, in a bad network situation, or when user has just started listening, t2 may be used to know when to switch from one chunk size to another. This may decrease buffering time.

The lower threshold may detect or be used to detect when the queue is becoming empty and through the download algorithm 1024 may cause a switch in chunk sizes downloaded. In embodiments, this may ensure that, if the queue empties and the media player 1040 needs to be stopped, there may be a shorter wait before content starts again. This technique may address fluctuations in a mobile network's download speed. For example, a user of a mobile device may drive through a tunnel where the mobile network's download speed may fluctuate. Because the chunks have been generated by the splitter 1012 and not by an encoder 104 the stitching may be seamless. Downloading the chunks into the queue may be effectively adding binary data resulting in seamless stitching.

The upper threshold may detect or be used to detect when the queue is becoming full and through the download algorithm 1024 may cause a switch in chunk sizes downloaded. In this case, the mobile network may be fast, and a user of the mobile device may not need to download new chunks at the same rate. In embodiments, this upper threshold may spare traffic on the application server and hence, may decrease the overall bandwidth cost of the system.

In embodiments, the amount of data present in the queue 1028 at any given point in time may depend on the speed at which content may be downloaded. The mobile network can be unreliable, so the queue 1028 may fluctuate as time passes. The methods and systems described herein may provide a quick startup time. For example, one may not have to wait 30 seconds before playback begins. In certain embodiments, no buffering may be required and one may not have to wait for a download to finish. The methods and systems described herein may provide clean and crisp playback, such as audio or video playback, with no noticeable breakage. The methods and systems described herein may reduce clicks or gaps in playback.

The methods and systems described herein may work well for mobile devices which may have or be associated with multiple network paths and/or which may adapt to network speed. For example, if the mobile device switches from one type of network to another, say, from a cell network to a Wifi hotspot, which causes an increase in network speed, the queue 1028 may rapidly fill and the chunk size downloaded may be adjusted. In embodiments, the mobile device may be a smartphone, cell phone, laptop, computer, netbook, pager, personal digital assistant and the like. In embodiments, the mobile device may include WiFi functionality, in addition to cellular network access. In an embodiment the mobile device may be an iPhone, BlackBerry 8110, Nokia N95, iPod Touch and the like. In embodiments, the mobile device may include only WiFi functionality.

In embodiments, the methods and systems described herein may be two-way or reversible and may enable the creation of content using the media player 1040 being uploaded to a content stream 102. The methods and systems described herein may enable a progressive download audio queue for a non-streaming smart phone.

The elements depicted in flow charts and block diagrams throughout the FIGURE imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server. In embodiments, the server may integrate with a CDN or the like for delivery of the content, content stream, media stream or the like. In embodiments, the CDN infrastructure may be a part of the network and service for the purposes of scalability and consistent throughput of stream quality and the like.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the FIGURE, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law. It will be appreciated that one skilled in the art can easily extend these embodiments to a wide variety of tasking instructions and scenarios.

All documents referenced herein are hereby incorporated by reference.

What is claimed is:

1. A method for enabling content streaming on a mobile device, the method comprising:
   encoding a content stream;
   providing the encoded content stream to a splitter embodied in computer executable code on a processor, which splits the encoded content stream into at least two channels, with each channel having a data chunk of a different chunk size, wherein the chunk size for each channel is based on a time interval of the content;
   downloading at least one data chunk into a playback queue, wherein a download algorithm determines the at least one chunk to be downloaded based on at least the size of the data chunk in relation to at least two of, an upper threshold, a lower threshold, and a current queue size of the playback queue at the time of download; and
   providing the at least one downloaded data chunk to a media player.

2. The method of claim 1, wherein the chunk sizes in the at least two channels are whole number multiples of each other.

3. The method of claim 1, wherein the mobile device is a smart phone.

4. The method of claim 1, wherein the content stream contains at least one of audio, video and data content.

5. The method of claim 1, wherein the content stream contains metadata providing additional information regarding the content.

6. The method of claim 1, wherein the content stream contains a live radio stream.

7. A method for enabling content streaming on a mobile device, the method comprising:
   encoding a content stream;
   providing the encoded content stream to a splitter embodied in computer executable code on a processor, which splits the encoded content stream into at least two channels, with each channel having a data chunk of a different chunk size, wherein the chunk size for each channel is based on file size;
   downloading at least one data chunk into a playback queue, wherein a download algorithm determines the at least one chunk to be downloaded based on at least the size of the data chunk in relation to at least two of, an upper threshold, a lower threshold, and a current queue size of the playback queue at the time of download; and
   providing the at least one downloaded data chunk to a media player.

8. A method for enabling content streaming on a mobile device, the method comprising:
   accepting a stream of data, wherein the data is encoded for a mobile network;
   splitting out a series of chunks of data sliced at particular time intervals, each of the chunks of a different chunk size;
   controlling the frequency of downloading, via a downloading algorithm, of the chunks of data into a playback queue of a processor based on thresholds, said thresholds based at least on the size of the data chunk in relation to at least two of, an upper threshold, a lower threshold, and a current queue size of the playback queue at the time of download; and
   providing the downloaded chunks of data to a media player.

9. The method of claim 8, wherein the sizes of the chunks are whole number multiples of each other.

10. The method of claim 8, wherein the data stream contains at least one of audio, video and data content.

11. A system for enabling content streaming on a mobile device, the system embodied in a non-transitory computer readable medium, comprising:
   an encoder that encodes a content stream to form an encoded content stream;
   a splitter embodied in computer executable code, which splits the encoded content stream into at least two channels, with each channel having a data chunk of a different chunk size;
   a download algorithm that downloads at least one data chunk into a playback queue, based on at least the size of the data chunk in relation to at least two of, an upper threshold, a lower threshold, and a current queue size of the playback queue at the time of download; and
   a media player to which at least one downloaded data chunk from the playback queue is provided.

12. The system of claim 11, wherein the chunk sizes in the at least two channels are whole number multiples of each other.

13. The system of claim 11, wherein the chunk size for each channel is based on a time interval of the content.

14. The system of claim 11, wherein the chunk size for each channel is based on file size.

15. The system of claim 11, wherein the content stream contains at least one of audio, video and data content.

16. The system of claim 11, wherein each data chunk is encrypted.

* * * * *

UNITED STATES PATENT AND TRADEMARK OFFICE
CERTIFICATE OF CORRECTION

| | | |
|---|---|---|
| PATENT NO. | : 8,892,761 B1 | Page 1 of 1 |
| APPLICATION NO. | : 12/418576 | |
| DATED | : November 18, 2014 | |
| INVENTOR(S) | : Nick Dingle et al. | |

It is certified that error appears in the above-identified patent and that said Letters Patent is hereby corrected as shown below:

On the Title Page, References Cited

On page 2, in column 2, under "Other Publications", line 32, delete "Aug. 8, 2008" and insert -- Aug. 18, 2008 --, therefor.

In the Specification

In column 1, line 12, delete "entirety" and insert -- entirety: --, therefor.

In column 1, line 61, delete "stream" and insert -- stream; --, therefor.

In column 9, line 33, delete "include" and insert -- include: --, therefor.

In the Claims

In column 12, line 12, in claim 8, delete "size;" and insert -- size, wherein the chunk size for each channel is based on at least one of a time interval of the content and, a file size; --, therefor.

Signed and Sealed this
Fourteenth Day of April, 2015

Michelle K. Lee
*Director of the United States Patent and Trademark Office*